G. W. COPE.
SCALE.
APPLICATION FILED DEC. 26, 1906.

913,202.

Patented Feb. 23, 1909.
2 SHEETS—SHEET 1.

FIG. 1.

WITNESSES
James P. Barry
Thos. O'Donnell

INVENTOR
George W. Cope.
BY Whittemore Hulbert Whittemore
ATT'YS.

G. W. COPE.
SCALE.
APPLICATION FILED DEC. 26, 1906.
913,202.
Patented Feb. 23, 1909.
2 SHEETS—SHEET 2.
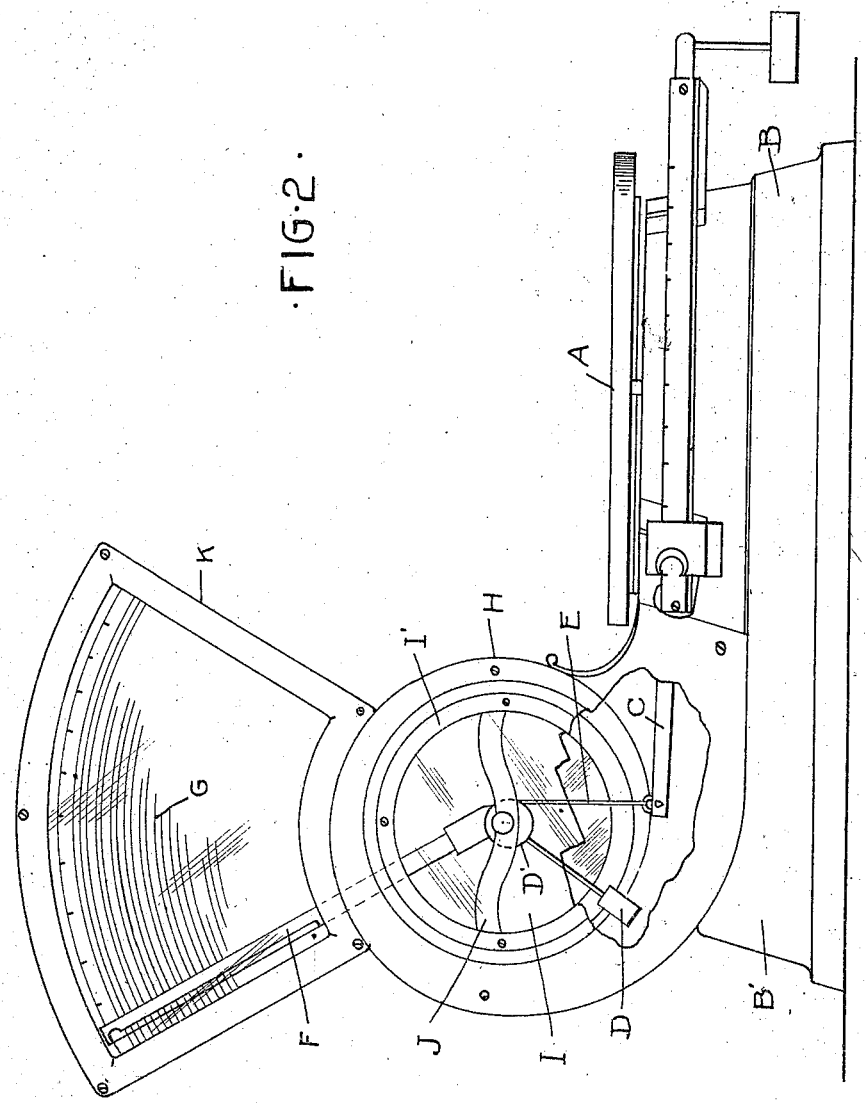

UNITED STATES PATENT OFFICE.

GEORGE W. COPE, OF DETROIT, MICHIGAN, ASSIGNOR TO WALTER F. STIMPSON, OF DETROIT, MICHIGAN.

SCALE.

No. 913,202.      Specification of Letters Patent.      Patented Feb. 23, 1909.

Application filed December 26, 1906. Serial No. 349,552.

*To all whom it may concern:*

Be it known that I, GEORGE W. COPE, a citizen of the United States of America, residing at Detroit, in the county of Wayne and State of Michigan, have invented certain new and useful Improvements in Scales, of which the following is a specification, reference being had therein to the accompanying drawings.

The invention relates to scales of the type known as automatic, and more particularly to a class in which the weighing is effected by the deflection of a pendent weight.

The invention consists in certain novel features of construction as hereinafter set forth.

In the drawings, Figure 1 is a perspective view of the scale; Fig. 2 is a longitudinal section therethrough.

A is the weighing platform supported on a lever, or beam, which is within a base B. The form of the platform is preferably circular, and the base is provided with a portion of similar form, and at one side thereof a projecting portion B', into which the end of the platform supporting lever C extends.

D is a pendent weight pivoted in bearings above the portion B' of the base, and having a suitable connection with the end of the lever C, such as the flexible connection E passing about a pulley D' secured to the pivot of the pendent weight. F is an index hand also connected to the pivot of the pendent weight, and which swings in reading proximity to a computing chart G whereby there is an automatic indication of both the weight and value of the articles placed on the scale platform.

The present invention includes as one of its features the novel construction of the frame, or casing, which supports and closes the pendent weight and its connections. It is desirable that this frame, or casing, should be so located as to provide ample clearance for articles placed on the weighing platform, and at the same time that the whole construction should be as compact as possible, and the casing of pleasing contour. These results I have accomplished by arranging the extension B' of the base tangentially from one side and at the rear of the circular portion thereof, and by mounting upon this extension a frame or casing member H constructed as follows: In contour, the member H is curved as an evolute, having the appearance of a snail shell. It is also provided with circular apertures in front and rear, which are normally closed by glass panels I. The bearing for the pivots of the pendent weight D is formed by a cross frame J, so arranged that the operating mechanism may be viewed through the transparent panels.

The form of the casing H is not only designed for its pleasing appearance, but is mechanically adapted to house the operating parts, and provide clearance for movement of the pendent weight without interfering with the weighing platform. Thus, the curved contour of the member H, as shown on left hand side of Fig. 2, provides clearance for the swinging of the pendent weight from its normal substantially vertical position through the full angle of the operation. At the same time, the contour of the member H, on the opposite side, or to the right in Fig. 2, is closer to the axis of the pivot for the pendent weight, and this provides the necessary clearance for the platform.

The computing chart G is mounted in a fan-shape casing K, which rises centrally from the member H to which it is secured. The member H is preferably formed in two sections joining each other in a central longitudinal plane, and one of these sections H' is preferably removable so as to provide access to all of the working parts. The glass panels I are also removable preferably by being secured in position by the rings I'.

What I claim as my invention is:

1. In a scale, the combination with a platform, a supporting lever therefor and a pendent weight operatively connected with said lever, of a frame or casing consisting of a base portion beneath the platform having a lateral extension from one side thereof forming a housing for the platform lever, and an upturned extension on said lateral extension forming a housing for the pendent weight, one side of said upturned extension being curved to provide clearance for the deflection of said pendent weight, and the opposite side being curved inward to provide clearance for the platform.

2. In a scale the combination with a platform, its supporting lever and a pendent weight operatively connected to said lever and above the same, of a frame or casing comprising a base having a circular portion beneath the platform and a tangential extension from said circular portion for inclosing said supporting lever, an upturned extension mounted on said tangential extension of snail-shape form, the larger curve thereof forming a housing for the pendent weight during its deflection, and a smaller curve providing clearance for the platform.

3. In a scale, the combination with a platform, a supporting lever therefor and a pendent weight operatively connected with said lever, of a frame or casing consisting of a base portion beneath the platform having a lateral extension from one side thereof forming a housing for the platform lever, an upturned extension on said lateral extension forming a housing for the pendent weight, one side of said upturned extension being curved to provide clearance for the deflection of said pendent weight, and the opposite side being curved inward to provide clearance for the platform, and annular transparent panels extending across said upturned extension.

4. In a scale, the combination with a platform, its supporting lever and a pendent weight operatively connected to said lever, of a frame or casing consisting of a circular base portion beneath the platform having a housing for said platform lever extending laterally from said circular portion and an upturned extension of snail shaped form mounted on said lateral extension.

5. In a scale, the combination with a platform, its supporting lever and a pendent weight operatively connected to said lever, of a frame or casing consisting of a base portion beneath the platform having a portion extending laterally from said base forming a housing for said platform lever, an upturned extension of snail-shaped form mounted on said lateral extension, and an annular transparent panel for the circular portion of the upturned extension.

6. A scale comprising a platform, a supporting lever therefor and a pendent weight operatively connected to said lever and above the same, a frame or casing consisting of a circular base portion beneath the platform having a portion extending laterally from said base forming a housing for said platform lever, an upturned extension of snail-shaped form mounted on said lateral extension, annular transparent panels for the circular portion of the upturned extension, and a computing chart on said snail-shaped portion.

7. A scale comprising a platform, a supporting lever therefor and a pendent weight operatively connected to said lever and above the same, a frame or casing consisting of a circular base portion beneath the platform, having a portion extending laterally from said base forming a housing for said platform lever, an upturned extension of snail shaped form mounted on said lateral extension and a computing chart on said snail shaped portion.

In testimony whereof I affix my signature in presence of two witnesses.

GEORGE W. COPE.

Witnesses:
   AMELIA WILLIAMS,
   JAMES P. BARRY.